March 30, 1926.  
J. M. BROWN  
CAMP TRAILER  
Filed June 24, 1920  
1,578,390  
7 Sheets-Sheet 4

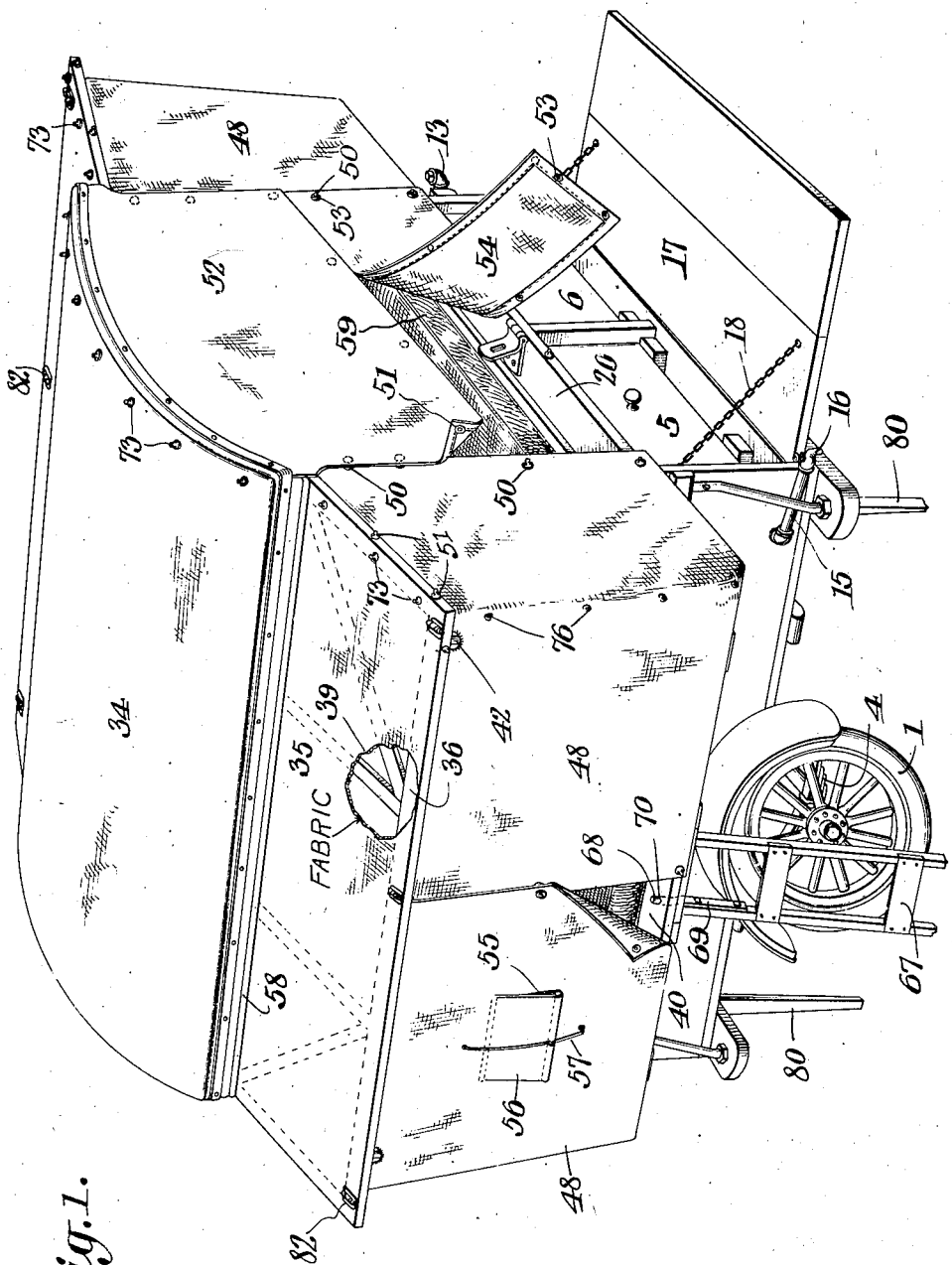

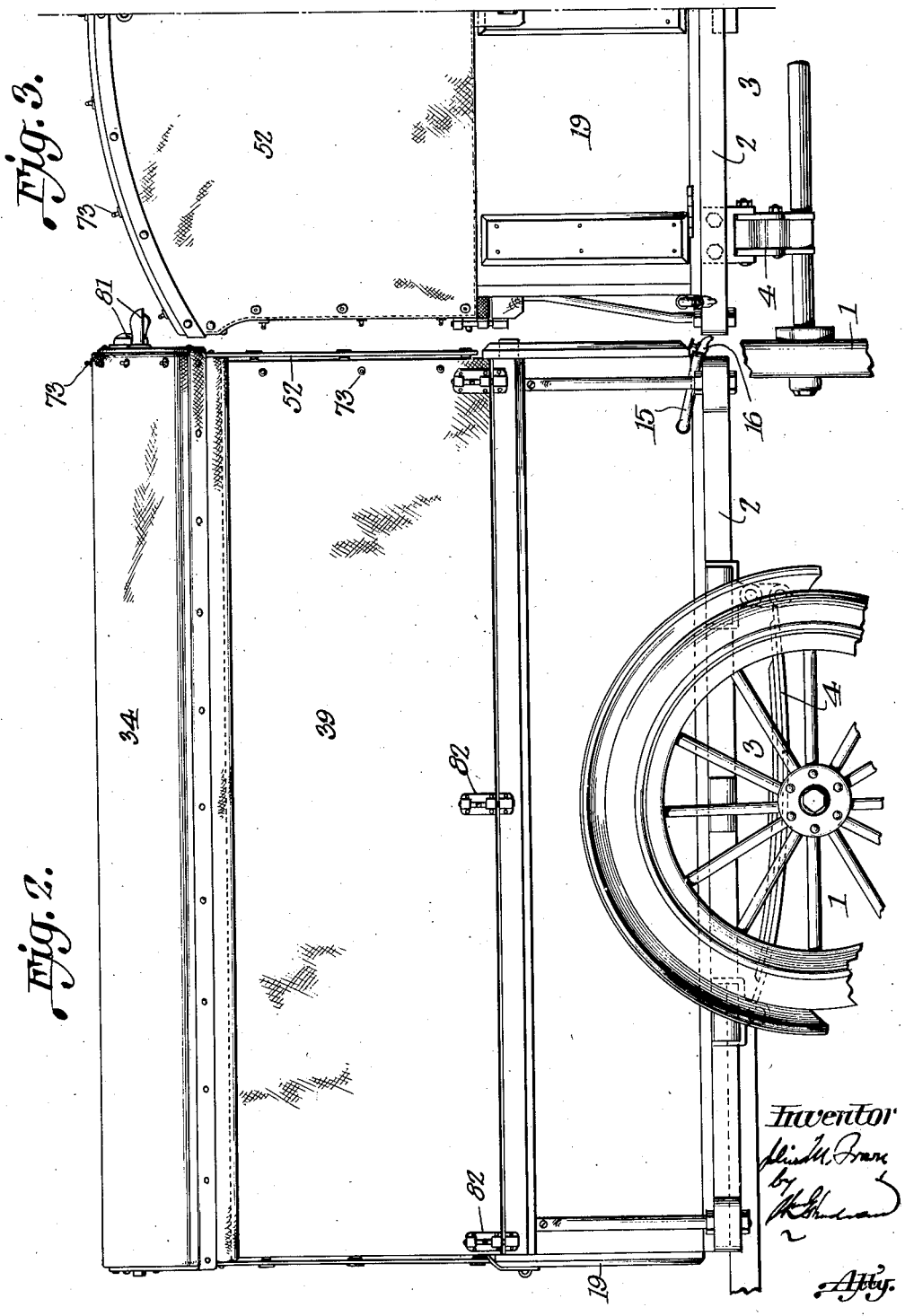

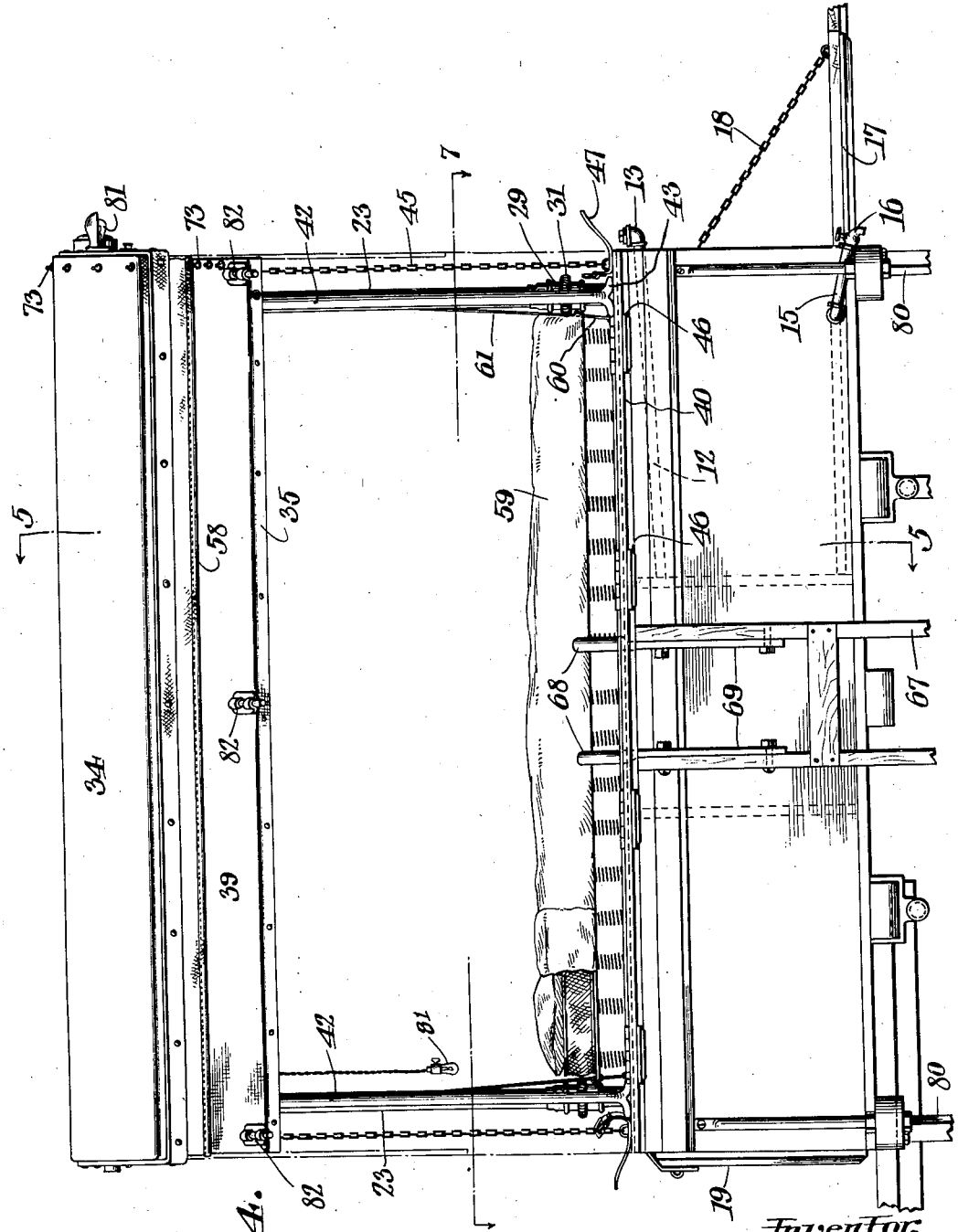

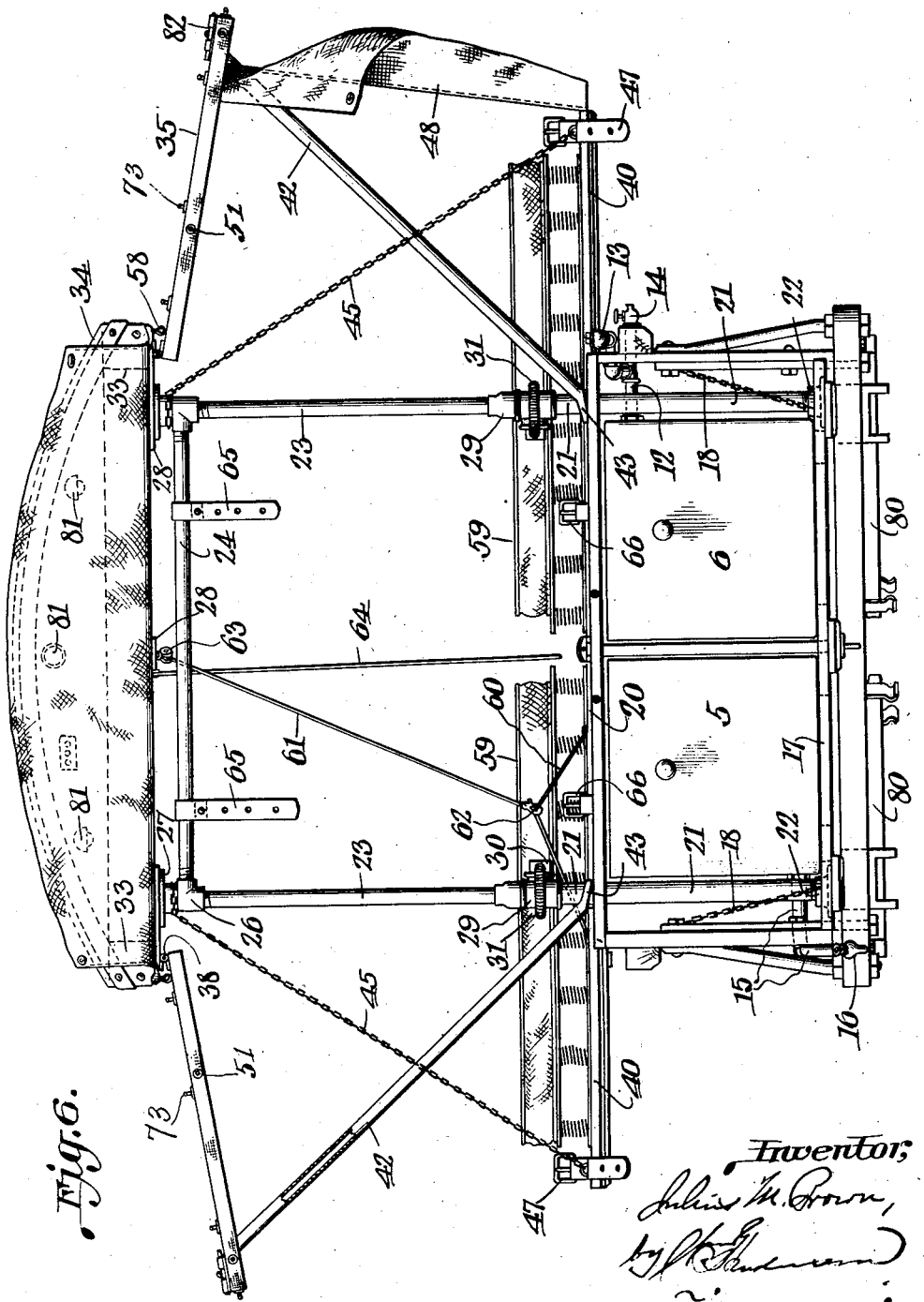

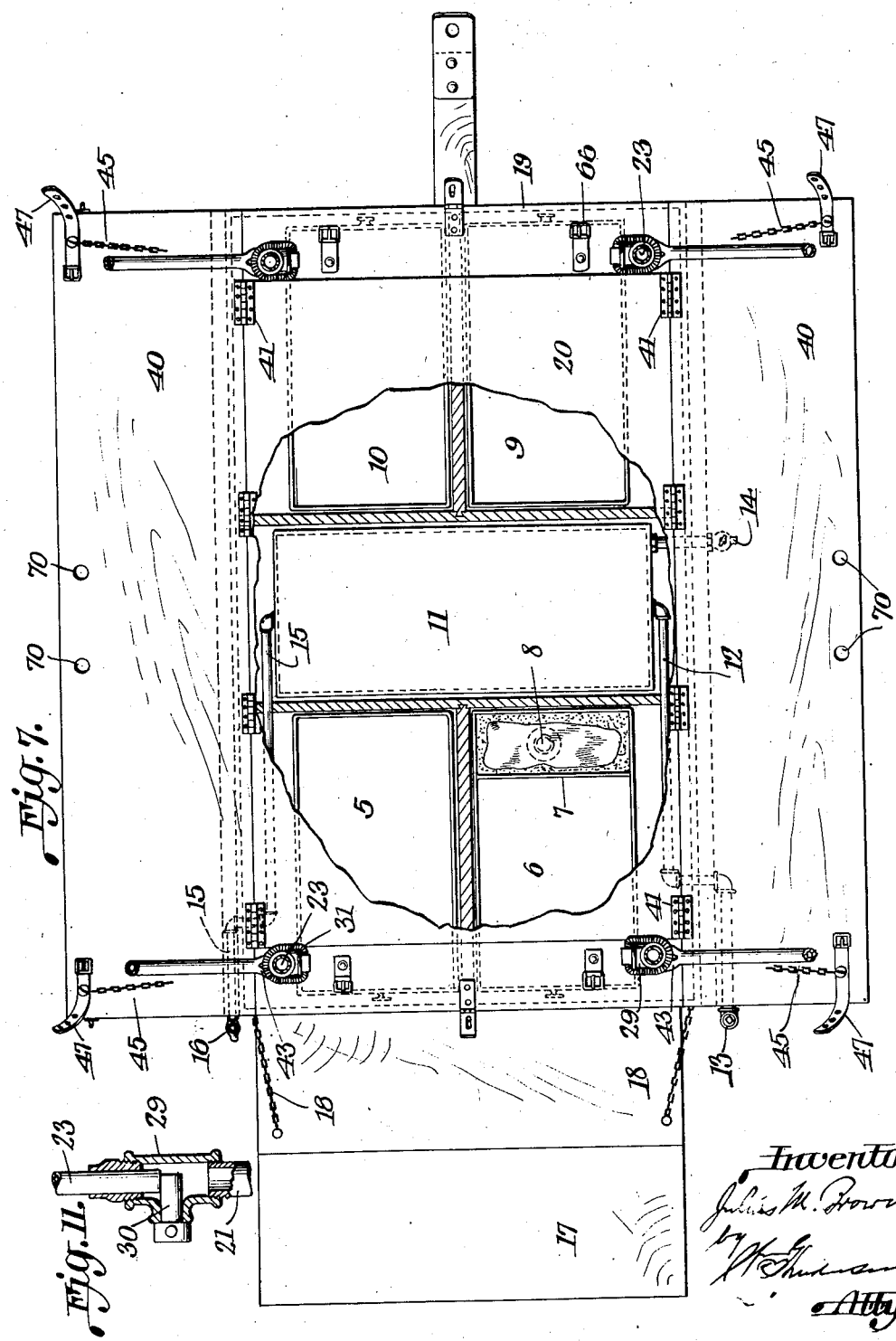

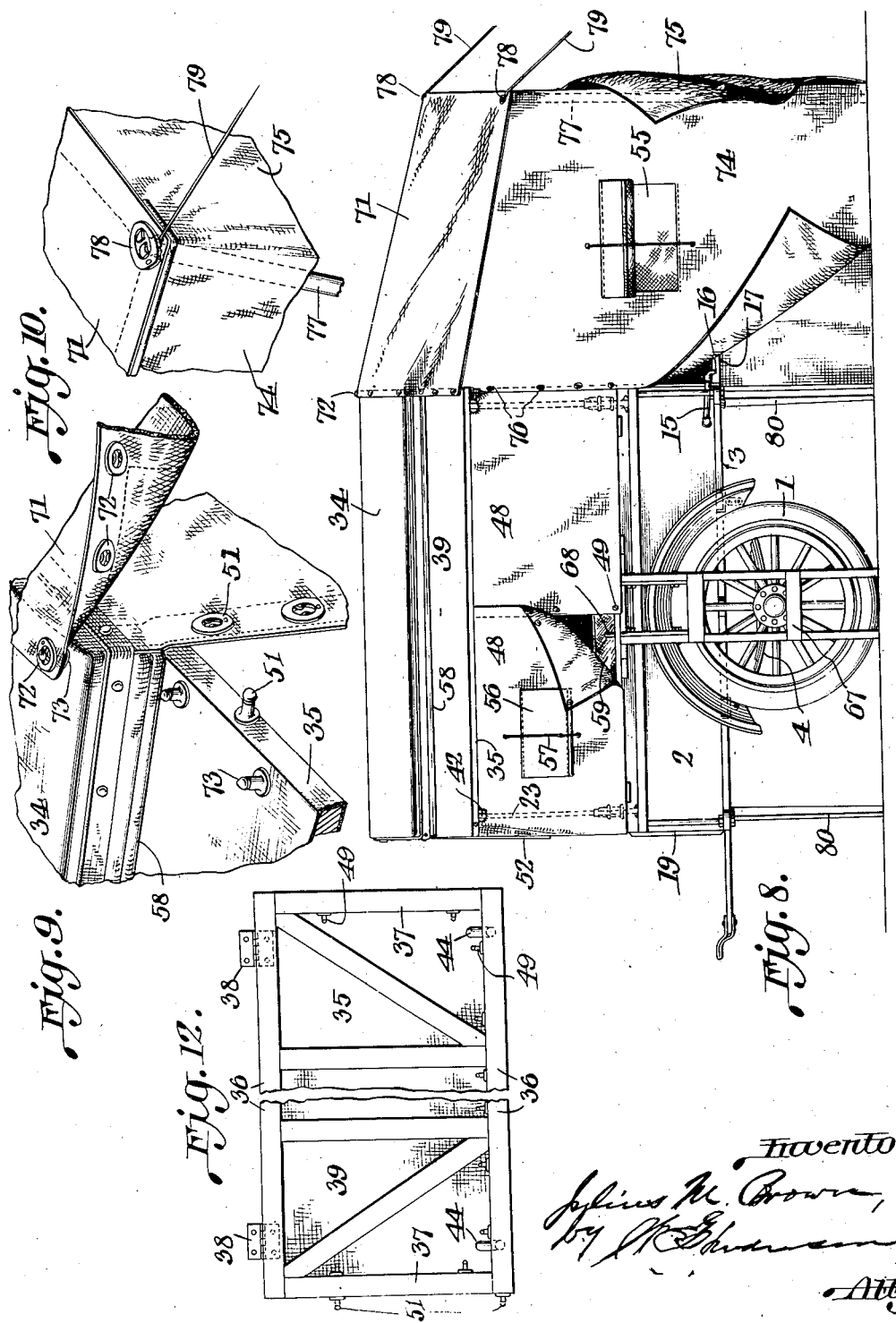

Patented Mar. 30, 1926.

1,578,390

UNITED STATES PATENT OFFICE.

JULIUS MINOR BROWN, OF DODSONVILLE, TEXAS, ASSIGNOR OF ONE-HALF TO THOMAS JEFFERSON STEWART, OF DODSONVILLE, TEXAS.

CAMP TRAILER.

Application filed June 24, 1920. Serial No. 391,491.

*To all whom it may concern:*

Be it known that I, JULIUS MINOR BROWN, a citizen of the United States, residing at Dodsonville, in the county of Collingsworth and State of Texas, have invented certain new and useful Improvements in Camp Trailers; and I do declare the following to be a full, clear, and exact description of the invention, such as will enable others skilled in the art to which it appertains to make and use the same, reference being had to the accompanying drawings and to the figures of reference marked thereon, which form a part of this specification.

My invention relates to camp trailers, and has for its object to provide a construction in which when the parts are adjusted to position for occupancy or sleeping purposes a practically wind and rain storm protection or shelter will be afforded, and in which the parts may be readily folded or collapsed to form a compact structure effectively excluding rain and wind and protecting the interior contents from damage. It has also for its object to so form and arrange the various parts that ample provision will be made for the compact and most convenient storage of various articles contributing to the convenience and comfort and necessities of camping parties; and also to provide for strength, stability and durability in the structure as a whole.

To the accomplishment of the foregoing and such other objects as may hereinafter appear the invention consists in the features hereinafter particularly described and then sought to be clearly defined by the claims, reference being had to the accompanying drawings forming a part hereof and in which Figure 1 is a perspective view showing the device with curtains closed;

Figure 2 is a side elevation;

Figure 3 is a half portion of the front in elevation;

Figure 4 is a side elevation with curtains raised and table lowered;

Figure 6 is an end elevation with hinged sides raised and bottom platforms extended or lowered;

Figure 7 is a sectional plan on 7—7 of Figure 4;

Figure 8 is a side elevation with rear fly tent in position;

Figure 9 is a detail perspective of a corner showing attaching means for rear fly tent;

Figure 10 is a detail perspective of a rear corner of fly tent showing one of the supporting poles;

Figure 11 is a detail section of coupling and locking bolt between telescoping sections of roof supports; and Figure 12 is a bottom-plan of hinged side frame.

Figure 5:
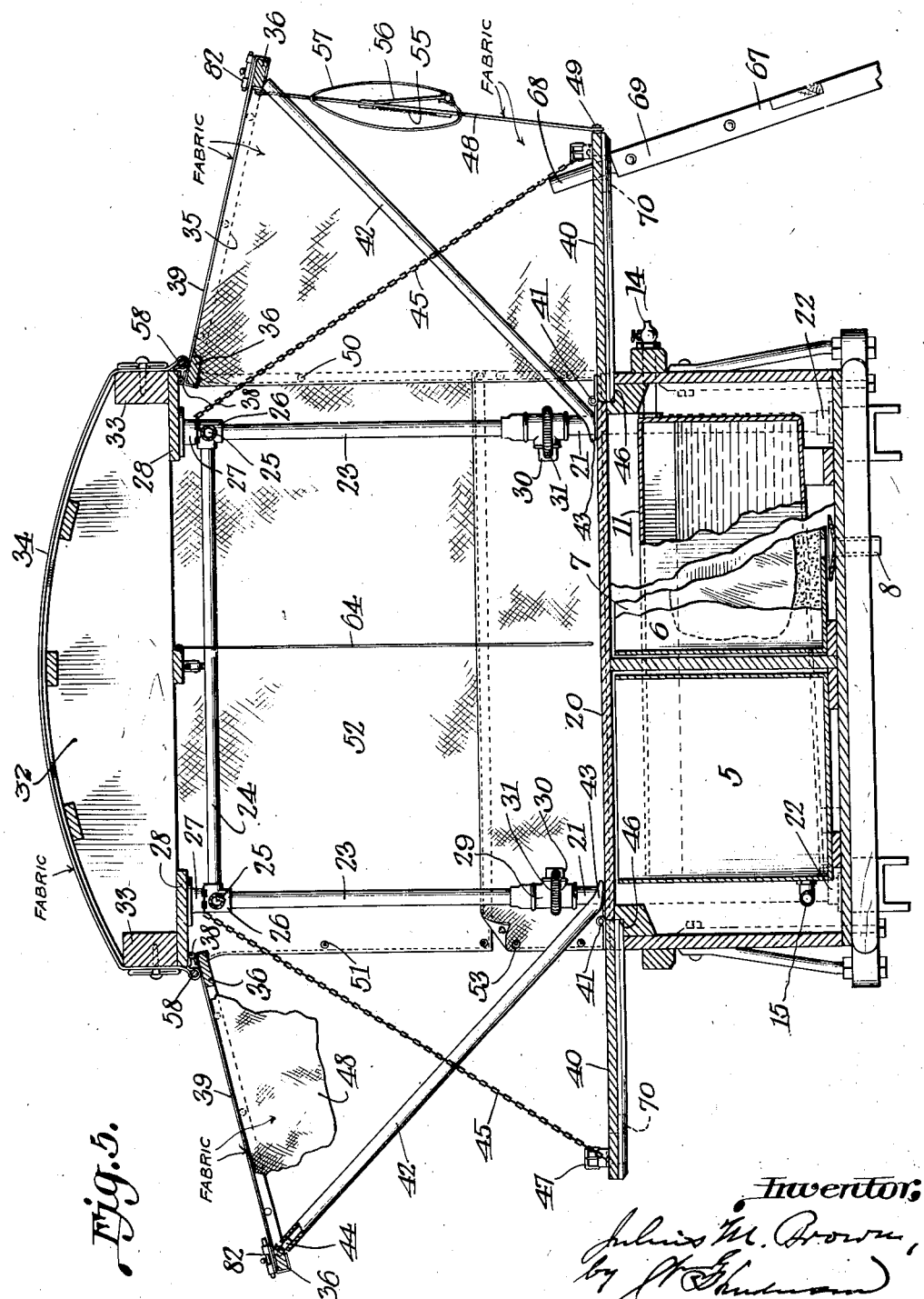
Figure 5 is a section on 5—5 of Figure 4.

In the drawings the numeral 1 designates the wheels of the trailer supporting a body 2 upon a truck 3 by springs 4 all of which may be of any suitable and preferred type of construction and having the features of my invention applied thereto. The interior of the body portion is divided by partitions into a suitable number of compartments, preferably to form two compartments at one end to receive slidably removable chests 5 and 6 designed for provision supplies and cooking utensils for a camping trip and one of which may be provided with an ice chest 7 from which a drain pipe 8 leads; and provided at the other end with chests 9 and 10 suitable for packing clothing; and between the two sets of end chests with a tank 11 designed to carry a supply of water to which tank is attached a water supply pipe 12 having an inlet coupling 13 at the rear end of the trailer and a vent pipe or cock 14, and from the tank 11 a pipe 15 leads to the rear end of the trailer where it is provided with a control cock 16 within easy reach of a person at the rear or kitchen end of the trailer. This end of the trailer is provided with a hinged drop door 17 which when lowered serves as a shelf or table and will be sustained by chains 18, and the opposite end next to the chests 9 and 10 will be provided with a similar or other form of door 19 for access to the compartments containing the chests 9 and 10. Above the several compartments is a suitable flooring 20. From the body portion of the trailer rises a suitable frame work for sustaining the roof, hinged sides and end curtains of the trailer, said frame work being formed in sections so that one section may be raised and lowered in relation to the other when the parts of the camp trailer are to be positioned for camping or to be closed for transportation or travel as the case may be. This frame work is of special construction designed to afford strength and stability and the easy extension and folding of its associated parts and the effective exclusion of rain and wind when the parts are positioned or adjusted for sleeping or living purposes. With the purposes mentioned in view the supporting frame is formed of upright posts 21, preferably of metal tubing formation positioned at the four corners of the body portion of the trailer and strongly attached thereto and braced at their lower ends, say by collars 22 strongly secured to suitable sills of the body portion. The upper portion of the frame consists of four uprights 23, preferably of tubular metal, which are connected together at their upper ends by transverse tie rods 24 and longitudinal tie rods 25 which may be connected by couplings 26 to the tubular uprights and which may be provided at their upper ends with flanged metal collars 27 to which timbers or members 28 of the top or roof of the trailer will be attached. The lower ends of the uprights 23 has a sliding or telescoping connection with the fixed upright posts 21, preferably by means of tubular couplings 29, so that the upper frame can be raised when the trailer is to be used for sleeping purposes and may be lowered when travel is resumed and the parts are folded and closed for compactness. When the uprights 23 are raised they are held in that position by locking dogs or pins 30 which pass through couplings 29 and lie beneath uprights 23 as clearly indicated in Figure 11, and these locking dogs are held in place by coiled springs 31 which encircle the couplings and have their ends suitably connected to the heads of the locking dogs. This affords a very simple and efficient spring connection between the dogs and couplings, and when the uprights 23 are lowered the dogs will press against the same under spring tension and thus prevent rattling and jumping of the uprights during travel.

The top or roof of the trailer is formed of a frame composed of transverse end members 32 and longitudinal members 28 and 33 and a covering 34 of suitable, and preferably waterproof, fabric. The sides of the living or sleeping apartment are each formed of an open frame 35 composed of longitudinal and tranverse members 36 and 37 hinged at 38 to the roof timbers and covered with a suitable, preferably water proof fabric 39 and adapted when the apartment frame is lowered for travel to completely close the sides and when the apartment is raised for sleeping purposes to stand at an inclination as shown in Figures 5 and 6 and constitute a water proof roof to the extension of the sleeping apartment formed by leaves or platforms 40 hinged at 41 to the flooring 20. When in the position shown in Figures 5 and 6, the roof frame 35 is supported by rods 42 each having a fork 43 at its lower end to straddle the fixed uprights 21 and at the other end having a pintle, or other suitable detachable connection 44, with the frame work of the extension roof so as to form a strong brace support for the roof extension. The platform 40, when in its lowered position, is suspended by chains 45 attached at their upper ends to the uprights 23, and the hinged end of the platform seats in a recess 46 formed in a longitudinal timber of the body portion of the trailer, as shown in Figure 5, so as to relieve the hinges from strain. When these platforms are folded up and the roof extensions 35 are turned down and the frame lowered, the platforms stand in an upright position and are secured by buckled-straps 47 to the adjacent uprights 23 and are covered by the side wings or roof extensions 35 so as to be protected and together form a double closed side wall to the sleeping apartment in travel or transport of the trailer.

When the side extension roofs 35 and the platforms 40 are extended to enlarge the sleeping apartment, the opposite ends and the front of the extended apartment are closed by two curtains 48 of suitable waterproof fabric each formed to have one portion cover the end and the other portion a section of the front and attached by suitable snap-fastenings 49, preferably such as are used for automobile curtains, to the edges of the extended roof frame and the edges of the platform, the end portions of the curtain being also provided with snap-fastenings 50 for attachment to corresponding or mate fastenings 51 attached to the edges of an end curtain 52, one at each end of the roof to the sleeping apartment, and to fastenings 53 on a fly or supplemental curtain 54 which is also attached by similar fastenings to the end curtain 52 and to the edge of the floor 20 when the apartment frame is raised for sleeping purposes. The meeting edges of the front curtains 48 are provided with similar snap-fastenings for securing the edges together. It is preferred to have one member of the snap-fastenings for the upper edge of the front and end curtains 48 applied to the inside of the frame constituting the extended roof but they may be otherwise applied. With the curtains formed and applied as described winds and rain are effectively excluded from the sleeping apartment in inclement weather.

To provide ventilation to the sleeping apartment the curtains may be provided with any desired screened openings or windows 55 which will have a drop curtain or blind 56 to which the opposite ends of a cord 57 is attached, the cord passing through suitable openings in the main curtain so that a person within the apartment by drawing or pulling on the cord may lift the drop curtain to the extent desired and thus obtain light or the ventilation desired, and the drop curtain will stand to the position to which adjusted.

To provide a weather tight joint where the hinged extension roof joins the main roof a strip or flap 58 of flexible or other suitable material is extended along the main roof so as to be in the path of the stiff member 36 of the extension roof in order to have the member 36 bear against the flap 58 when the extension roof is raised and thus form a close weather joint along such junction.

The mattresses, designated by the numerals 59, when arranged for use, are moved from a central position, one on top of the other, sidewise to the positions indicated in Figure 6, so that each will lie partially on the floor 20 and partially on the drop extension platforms 40. When not in use they will be stored centrally in the apartment one on top of the other. For lifting one mattress either in shifting to position for use or for storing, one mattress is provided at opposite ends with a member 60, preferably of a flexible loop character, with which is connected the opposite ends of a rope or cable 61 by means of snap-hooks 62, or otherwise, which cable passes over pulleys 63 suitably supported at the roof of the apartment and extends from one end to the other of the apartment at the roof thereof. When the mattress having this lifting device is to be raised the cable is grasped at the roof portion and pulled on so that the mattress is raised and then swung sidewise either into position for use as shown in Figure 6, or from that position into place above the other mattress when both are stored one upon the other into non-use position. The slack in the lifting cable at the roof is automatically taken up by the mattress settling to its position both in use and non-use position, and thus is kept taut at that point. A curtain 64 may be suitably supported from the roof so as to hang between the two mattresses and divide the apartments into compartments. For the purpose of holding the mattresses in place one on top of the other when the frame of the apartment is lowered for transport or travel, the end upper cross bars 24 of the frame may be provided with straps 65 and the mattresses with buckles 66 so that the parts may be strapped together.

For easy access to the apartment when the mattresses are in position for use, I provide a ladder 67 which has at its upper end projecting pintles 68 preferably being part of metal plates 69 bolted to the sides of the ladder so that the pintles will pass through openings 70 in the side platforms 40 thereby holding the ladder in place, and enabling the ladder to afford a steadying support for the platform and prevent swaying of the same.

The trailer is provided with a tent fly or canopy for the end used as a kitchen so as to afford protection against inclement weather. This fly or canopy is made of suitable fabric, preferably of waterproof character, and consists of a top 71 having snap members 72 along one edge to engage with companion stud members 73 placed along the adjacent edge of the apartment roof and also along the top of the adjacent end of the folding side frame extensions 35 so as to be properly supported at that end and form a covering for the area described by the width of the trailer plus the width of the side frame extensions 35. The canopy or fly has also depending sides 74 as a continuation of the top and a depending rear end curtain or portion 75 being a continuation of the side curtains which is divided centrally on a vertical line to form flaps which may be turned to one side for access and egress to and from the canopy, and the meeting edges of these end flaps may be provided with suitable fastening devices. The edges of the sides of the canopy will be attached by snap fastenings 76 to the side curtains of the sleeping apartment. The rear portion of the fly or canopy is supported at its rear end by two or more removable poles 77 the upper end of which will be detachably engaged with suitably reinforced sockets 78 formed at the top of the canopy as indicated in Figures 8 and 10, and guy ropes 79. The sides of the canopy may also be provided with a ventilating window 55 like that provided for the sides of the sleeping apartment. When the trailer is to be transported this fly or canopy is readily detached and folded and stored in the trailer.

For the purpose of steadying and prevent rocking of the trailer when camping, detachable or folding legs 80 may be positioned at opposite ends of the trailer by suitable connections with cross members as timbers of the trailer body. Electric lights 81 may be located at points desired and be supplied with current from a storage battery or other source, and suitable switches may be used for controlling the lights.

For the purpose of fastening the hinged side frames 35 when the apartment frame is lowered and the trailer closed for transport, the side frames may be provided with suitable locking bolts 82 that will engage suitable keepers on a part of the trailer body.

The camp trailer constructed as described is compact and can have its parts readily adjusted for camping and easily collapsed or contracted for transport, and in either its transport or camping adjustment affords a structure effectively protected against inclement weather and other conditions; and contains in its make-up many conveniences for the traveler or camper.

I have described with particularity the preferred details of the various parts, but changes can be made therein and some features omitted without departing from essential features of the invention.

Having described my invention and set forth its merits what I claim is:

1. A camp trailer having a body portion divided into chest end compartments and a transversely extending water compartment positioned between the adjacent ends of the chest compartments, an inlet for supplying water to the water compartment, a delivery pipe leading from the water compartment and having a control valve located at one end of the trailer body, and a convertible end door and table shelf located at the end of the trailer body where the delivery pipe from the water compartment is provided with its control valve.

2. A camp trailer comprising a vertically adjustable frame formed of upright metal corner posts connected together at their upper ends by transverse and longitudinally extending metal tie rods and carrying a top, covered side frames hinged at their upper ends at the sides of the top and serving when lowered to close the sides of the adjustable frame and when raised constituting side extensions of the top, upwardly and outwardly inclined rods having lower forked ends straddling the vertical corner posts of the adjustable frame and at the other end connected with the outwardly extended side frames to support the frames in their elevated position, mattress supporting platforms hinged at their inner ends to a part of the trailer and adapted to lie within the hinged side frames when raised and when lowered to lie below the hinged side frames, and cables for sustaining the platforms in their lowered positions.

3. A camp trailer comprising a vertically adjustable frame composed of sectional tubular members, the lower members being stationary and the upper members telescoping therewith, couplings between the upper and lower sections, locking bolts fitting in said couplings for holding one section relatively to the other, and coiled springs connected to said locking bolts and encircling the couplings between the telescoping members.

4. A camp trailer comprising an adjustable frame, a top and bottom, mattresses supported on the bottom and adapted to be superimposed one upon the other, and a cable connected at opposite ends to one of the mattresses and extended over pulleys at the upper portion of the frame, said cable serving to lift one of the mattresses and permit it to be swung to one side when the portion of the cable between the pulleys is lowered.

5. A camp trailer comprising a vertically adjustable frame, a top and bottom to the frame, mattresses supported upon the bottom and adapted to lie one upon the other, and companion fastenings attached to the mattresses and to an upper part of the adjustable frame, for holding the mattresses superimposed one upon the other when the adjustable frame is lowered.

In testimony whereof I affix my signature.

JULIUS MINOR BROWN.